United States Patent

Bertling et al.

[11] Patent Number: 5,477,436
[45] Date of Patent: Dec. 19, 1995

[54] ILLUMINATING DEVICE FOR MOTOR VEHICLES

[75] Inventors: Johannes-Gerhard Bertling, Vaihingen/Enz; Doris Boebel; Peter Schoettle, both of Stuttgart, all of Germany

[73] Assignee: Robert Bosch GmbH, Stuttgart, Germany

[21] Appl. No.: 89,757

[22] Filed: Jul. 9, 1993

[30] Foreign Application Priority Data

Aug. 29, 1992 [DE] Germany ............................ 42 28 895.9

[51] Int. Cl.⁶ .................................................... F21V 9/00
[52] U.S. Cl. ............................ 362/231; 362/61; 362/244; 362/259; 362/800
[58] Field of Search ................................ 362/61, 80, 231, 362/242, 244, 246, 800, 259

[56] References Cited

U.S. PATENT DOCUMENTS 4,951,179  8/1990  Machida .......................... 362/800 X
5,136,483  8/1992  Schöniger et al. ................. 362/800 X

FOREIGN PATENT DOCUMENTS 3315785  11/1984  Germany.

*Primary Examiner*—Stephen F. Husar
*Attorney, Agent, or Firm*—Michael J. Striker

[57] ABSTRACT

An illuminating device for motor vehicles has a plurality of light sources formed as semiconductor light sources, each of the semiconductor light sources emitting light of only one color and light colors emitted by different semiconductor light sources are different. The semiconductor light sources include several semiconductor light sources which emit light of a same color. The semiconductor light sources are distributed so that the lights emitted by all semiconductor light sources produce a light of a uniform color which exits the illuminating device.

8 Claims, 1 Drawing Sheet

5,477,436

ILLUMINATING DEVICE FOR MOTOR VEHICLES

BACKGROUND OF THE INVENTION

The present invention relates to an illuminating device for motor vehicles.

More particularly, it relates to an illuminating device which has several light sources formed as semiconductor light sources.

Illuminating devices of the above mentioned general type are known in the art. One of such illuminating devices is disclosed for example in the German document DE-A1 33 15 785. This illuminating device has several semiconductor light sources in form of light diodes as light sources. The light diodes are three-phase light diodes which, depending on electrical control can emit light in at least two different colors. With this illuminating device it is possible to switch between at least two different colors, and all light diodes emit light of the same color. With this construction the illuminating device can be used for different illuminating and signalling functions. Utilization of this illuminating device as headlight is however possible only to a limited degree since the light diodes cannot emit white light, but instead they emit red, green and yellow light. Moreover, the three-phase light diodes are more expensive than simple semiconductor light sources which emit only the light of one color. Also, the control of the three-phase light diodes requires a higher expense so that this illuminating device requires both high manufacturing costs and cannot be produced in a cost favorable manner.

SUMMARY OF THE INVENTION

Accordingly, it is an object of the present invention to provide an illuminating device of the above mentioned type, which avoids the disadvantages of the prior art.

In keeping with these objects and with others which will become apparent hereinafter, one feature of the present invention resides, briefly stated, in an illuminating device for motor vehicles which has light sources formed as several semiconductor light sources, wherein each semiconductor light source emits light of only one color, the light colors emitted by different semiconductor light sources are different, and several semiconductor light sources which emit the light of the same color are provided and the semiconductor light sources are distributed so that by overlapping of lights emitted from all semiconductor light sources light of a single color is emitted by the illuminating device as a whole.

When the illuminating device is designed in accordance with the present invention, desired uniform light colors can be obtained with the utilization of simple semiconductor light sources which emit only light of one color. For example, due to corresponding selection and arrangement of individual semiconductor light sources, white light can be produced, so that illuminating can be used as a headlight.

In accordance with a further embodiment of the present invention, the semiconductor light sources are covered with a common transparent light disc provided with optical elements, so that light emitted by the individual semiconductor light sources is overlapped on one another for color mixing.

In accordance with a further feature of the present invention, each semiconductor light source has a transparent cover provided with optical elements, so that the light emitted by the individual semiconductor light sources overlaps on one another for color mixing. In both cases a uniform color mixing is obtained. The covers can be applied on the light sources preferably during the manufacture.

In accordance with still a further feature of the present invention, the covers are provided with optical elements which influence the light emitted by the semiconductor light sources for forming a predetermined light intensity distribution. With this construction the optical elements of the individual semiconductor light sources can be replaced with a joint light disc with optical elements and it suffices where needed to provide a clear disc as a cover.

In accordance with still another feature of the present invention, the optical elements can be formed as diffraction optical elements, on which the expansion direction of the light emitted by the semiconductor light sources can be changed by diffraction. Such optical elements can be arranged on small covers of the semiconductor light sources, which is usually difficult to do with known macroscopic lenses and/or prisms.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
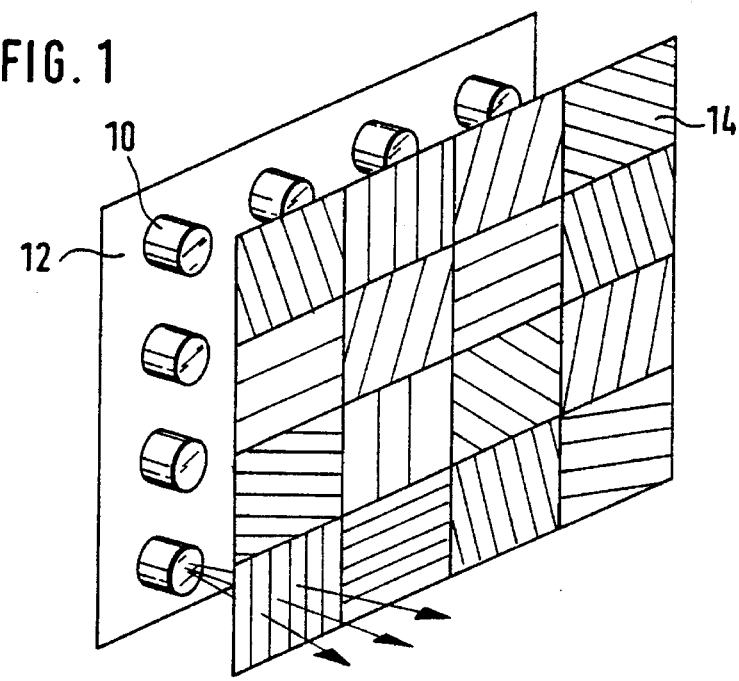
FIG. 1 is a view showing an illuminating device in accordance with a first embodiment of the present invention.
Figure 2:
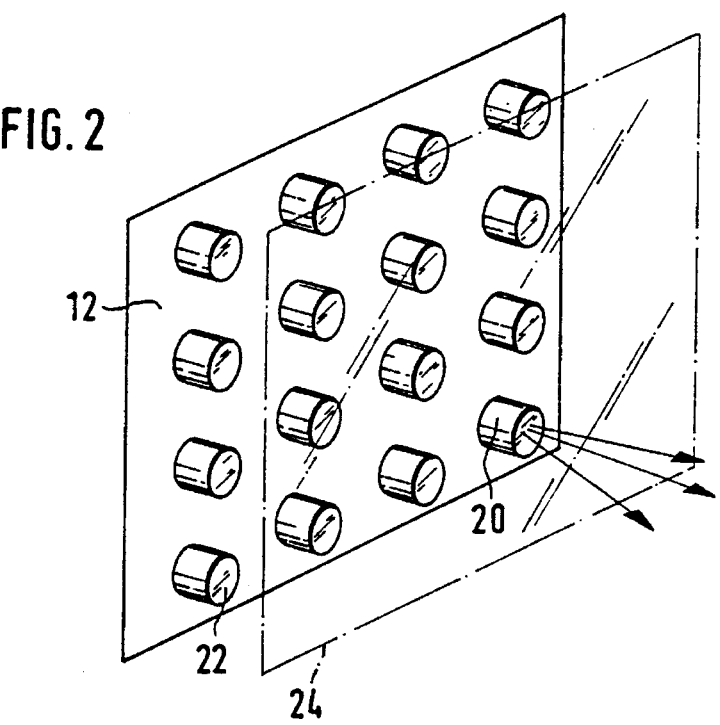
FIG. 2 is a view showing the illuminating device in accordance with a second embodiment of the invention.
Figure 3:
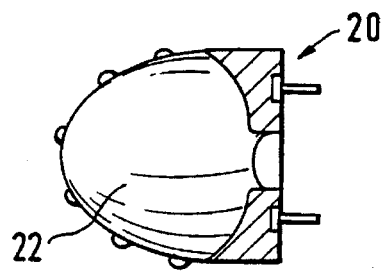
FIG. 3 is a view showing a semiconductor light source of the illuminating device of FIG. 2 on an enlarged scale.

An illuminating device for motor vehicles shown in FIGS. 1–3 has a plurality of light sources formed as semiconductor light sources 10. The semiconductor light sources 10 are arranged on a base plate 12, on which they are held and electrically connected with one another and with a voltage source. The number of the semiconductor light sources 10 is adjusted in correspondence with the illumination intensity required for the corresponding application of the illuminating device. The semiconductor light sources 10 emit light of different colors while each semiconductor light source 10 emits the light of only one color. The semiconductor light sources which emit different light colors can be arranged irregularly or in accordance with a predetermined pattern.

The semiconductor light sources 10 are covered with a light disc 14 provided with optical elements. The optical elements influence the light emitted by the light sources 10, or in other words disperses and/or deviates the light. A color mixing is obtained by the dispersion and/or deviation of the light emitted by the light sources 10. More particularly, the light beams emitted by the individual light sources 10 are overlapped over one another. The light exiting the illuminating device has thereby a uniform color which depends on the selection of the light colors of the individual semiconductor light sources 10. With the utilization of the semiconductor light sources 10 emitting blue, red and yellow light, the light exiting the illuminating device is white light. With this selection of the semiconductor light sources 10 the illuminating device can be used as a headlight of a motor vehicle.

By corresponding selection of the light colors of the semiconductor light sources and corresponding selection and arrangement of the light sources emitting different light colors, different uniform light colors can be obtained. Therefore, the illuminating device can be used for different applications. The number of the semiconductor illuminating sources 10 depends on the light flux which is transmitted by them. Under certain conditions the semiconductor light sources of different colors emit not the same light flux, so that different numbers of the sources are required to obtain white light.

The light emitted by the semiconductor light sources 10 is moreover influenced by the optical elements for forming a desired or prescribed light intensity distribution. For illuminating devices for motor vehicles there are certain regulatory requirements with respect to light intensity distribution, in which both maximum permissible and minimum required light intensity values are regulated for different regions of the surrounding areas to be illuminated by the illuminating device.

The optical elements of the light disc 14 can be formed in a known manner as macroscopic lenses and/or prisms. Alternatively, the optical elements can be also formed as diffraction optical elements which are composed of diffraction structures with dimensions in the order of the wavelength of the light emitted by the semiconductor light sources 10. With the diffraction optical elements the light is not only deviated and/or dispersed by refraction, but also by the diffraction of the light on them in correspondence with the wave nature of the light. The expansion direction of the light is changed when the expansion of the light is distorted by the diffraction optical elements which form an obstacle, as disclosed for example in U.S. Pat. No. 5,323,302.

In the second embodiment of the illuminating device shown in FIG. 2 also a number of light sources formed as semiconductor light sources 20 are provided and emit light of different colors. In deviation from the first embodiment, each semiconductor light source 20 is provided with a transparent cover 22 as shown in FIG. 3. The covers 22 are provided with optical elements which influence the light emitted by the semiconductor light sources 20. The optical elements are formed as diffraction elements, as was explained hereinabove with reference to the light disc 14. They can be arranged without difficulties on the covers 22 having small dimensions. The diffraction optical elements are formed and arranged so that on the one hand they provide an overlapping of the light emitted by the individual semiconductor light sources 20 and therefore serves for a color mixing. On the other hand, the deviation and/or dissipation of light produced by the diffraction optical elements provides a desired or a prescribed light distribution. For this purpose, the individual semiconductor light sources 20 must be provided with covers having different diffraction optical elements, depending on their position on the base plate. With this construction of the individual semiconductor light sources 20, it suffices to arrange a clear light disc 24 which has no optical elements, to cover the semiconductor light sources 20. The covers 22 are mounted preferably directly during the manufacture of the semiconductor light sources 20.

Alternatively, the semiconductor light sources 20 can be provided with the covers 22 with the same diffraction optical elements. Thereby a pre-distribution of the light emitted by the semiconductor light sources 20 is obtained, for example for color mixing, while due to the light disc 24 provided with optical elements, the desired light intensity distribution is produced.

The semiconductor light sources 10, 20 can be formed as light diodes which emit radiation when they are supplied with current flow. Moreover, it is possible to use laser diodes which provide the conversion of the electric energy into a laser light. Generally speaking, the utilization of the semiconductor light sources in the illuminating devices provides a substantially reduced structural depth when compared with the utilization of incandescent lamps, and there are many design and construction possibilities.

It will be understood that each of the elements described above, or two or more together, may also find a useful application in other types of constructions differing from the types described above.

While the invention has been illustrated and described as embodied in an illuminating device for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An illuminating device for motor vehicles, comprising a plurality of light sources formed as semiconductor light sources, each of said semiconductor light sources emitting light of only one color and the colors of the light emitted by different semiconductor light sources are different, said semiconductor light sources producing a light of a uniform color which exits the illuminating device; and means for color mixing the light emitted by said different semiconductor light sources and including a joint transparent light disc which covers said semiconductor light sources and is provided with optical elements by which the lights emitted by the individual semiconductor light sources are superposed over one another and provide a color mixing.

2. An illuminating device as defined in claim 1, wherein said light disc is further provided with optical elements which influence the light emitted by said semiconductor light sources for forming a predetermined light intensity distribution.

3. An illuminating device as defined in claim 1, wherein each of said semiconductor light sources is provided with a transparent cover having optical elements by which the lights emitted by the individual semiconductor light sources are superposed over one another for a color mixing.

4. An illuminating device as defined in claim 3, wherein said covers are further provided with optical elements which influence the light emitted by said semiconductor light sources for forming a predetermined light intensity distribution.

5. An illuminating device as defined in claim 3, wherein said covers of all said semiconductor light sources are identical; and further comprising a joint transparent light disc which covers said semiconductor light sources and is provided with optical elements by which the light emitted by said semiconductor light sources is influenced for forming a predetermined light intensity distribution.

6. An illuminating device as defined in claim 3, wherein said optical elements are formed as diffraction optical elements, on which an expansion direction of the light emitted by said semiconductor light sources is changed by diffraction.

7. An illuminating device as defined in claim 1, wherein said semiconductor light sources are formed as light diodes.

8. An illuminating device as defined in claim 1, wherein said semiconductor light sources are formed as laser diodes.

* * * * *